(12) United States Patent
Koenig

(10) Patent No.: US 7,886,544 B2
(45) Date of Patent: Feb. 15, 2011

(54) PROPELLER OR PROPELLER DRIVE

(76) Inventor: Christian Koenig, Stiegensagge 7, Graz (AT) A-8010

( * ) Notice: Subject to any disclaimer, the term of this patent is extended or adjusted under 35 U.S.C. 154(b) by 1011 days.

(21) Appl. No.: 11/410,581

(22) Filed: Apr. 24, 2006

(65) Prior Publication Data

US 2007/0056291 A1 Mar. 15, 2007

(30) Foreign Application Priority Data

Sep. 9, 2005 (DE) .................. 10 2005 043 615

(51) Int. Cl.
*F02C 6/04* (2006.01)

(52) U.S. Cl. .................. 60/784; 244/53 R; 244/60; 244/62; 416/94; 416/93 A; 416/245 R; 416/245 A

(58) Field of Classification Search .................. 60/784, 60/226, 226.1; 244/53 R, 54, 60, 62; 415/124.1; 416/170 R, 245 R, 245 A, 94, 94 A
See application file for complete search history.

(56) References Cited

U.S. PATENT DOCUMENTS

| | | | | |
|---|---|---|---|---|
| 2,586,054 A | * | 2/1952 | Jonas | 416/90 R |
| 2,613,749 A | * | 10/1952 | Price | 416/129 |
| 2,848,054 A | * | 8/1958 | Pearl | 416/94 |
| 3,901,626 A | * | 8/1975 | McMurthy | 416/157 R |
| 4,688,995 A | * | 8/1987 | Wright et al. | 416/127 |
| 4,738,589 A | * | 4/1988 | Wright | 416/127 |
| 4,815,273 A | * | 3/1989 | Rudolph et al. | 60/792 |
| 4,915,586 A | * | 4/1990 | Williams | 416/89 |
| 4,930,725 A | * | 6/1990 | Thompson et al. | 244/53 R |
| 5,090,869 A | * | 2/1992 | Wright | 416/147 |
| 5,174,502 A | * | 12/1992 | Lippmeier et al. | 239/265.41 |
| 7,121,503 B2 | * | 10/2006 | Cordy, Jr. | 244/45 A |
| 7,308,869 B2 | * | 12/2007 | Stone | 123/19 |

FOREIGN PATENT DOCUMENTS

| | | |
|---|---|---|
| DE | 3611792 C2 | 11/1986 |
| DE | 10040577 A1 | 3/2002 |
| GB | 2169968 A * | 7/1986 |
| GB | 2169968 A * | 7/1986 |
| GB | 2179702 A * | 3/1987 |

* cited by examiner

*Primary Examiner*—Michael Cuff
*Assistant Examiner*—Young Choi
(74) *Attorney, Agent, or Firm*—Kilpatrick Townsend and Stockton LLP

(57) ABSTRACT

A propeller or propeller drive, the propeller being carried by a support shaft (3) which projects from the body (53) of the missile or vehicle and about which the propeller rotates, the drive unit for the propeller being situated in front of the propeller (23) in the propulsion direction or in the propeller spinner (1). According to the invention it is provided that the drive unit has at least one gas turbine (55), optionally a multiple-stage gas turbine, which is secured to the drive shaft and which drives it or jointly rotates with it, and that the drive shaft (6) is traversed by the support shaft (3) or is mounted thereon in a rotating manner and drives the propeller (23), optionally by way of a gear mechanism (14) situated between the turbine (55) and the propeller (23).

30 Claims, 10 Drawing Sheets

Overall illustration of drive unit

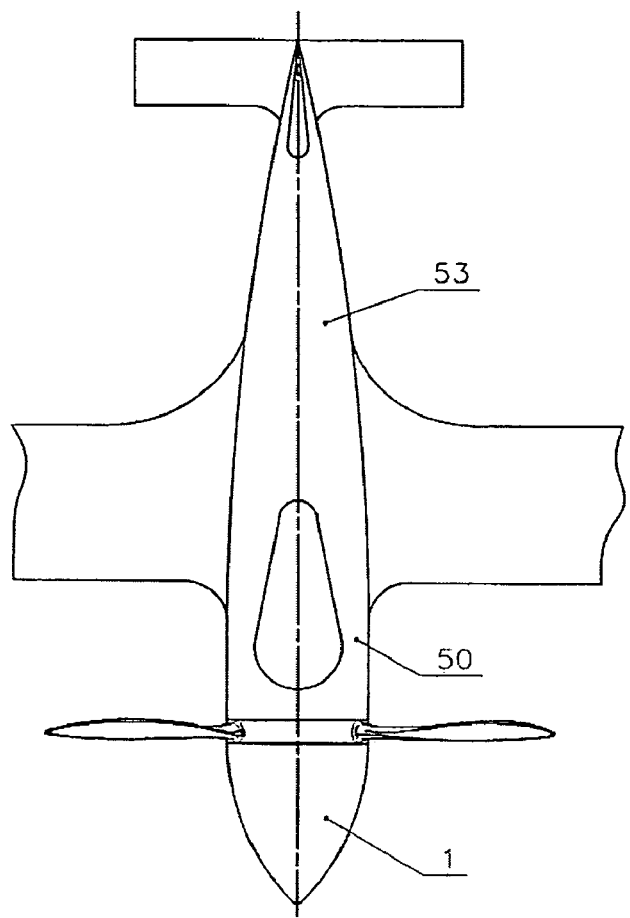
Figure 1 – Drive unit for propeller-driven aeroplanes
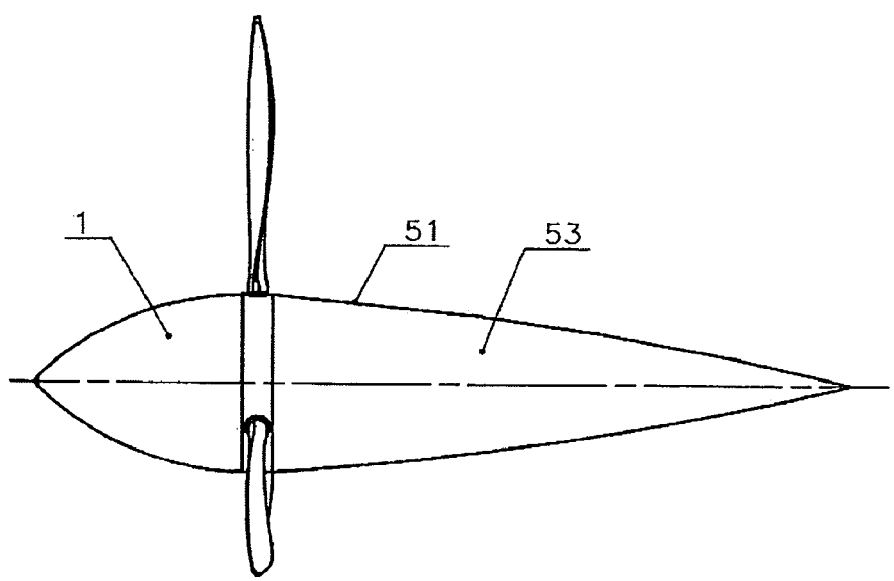
Figure 2 – Drive pod

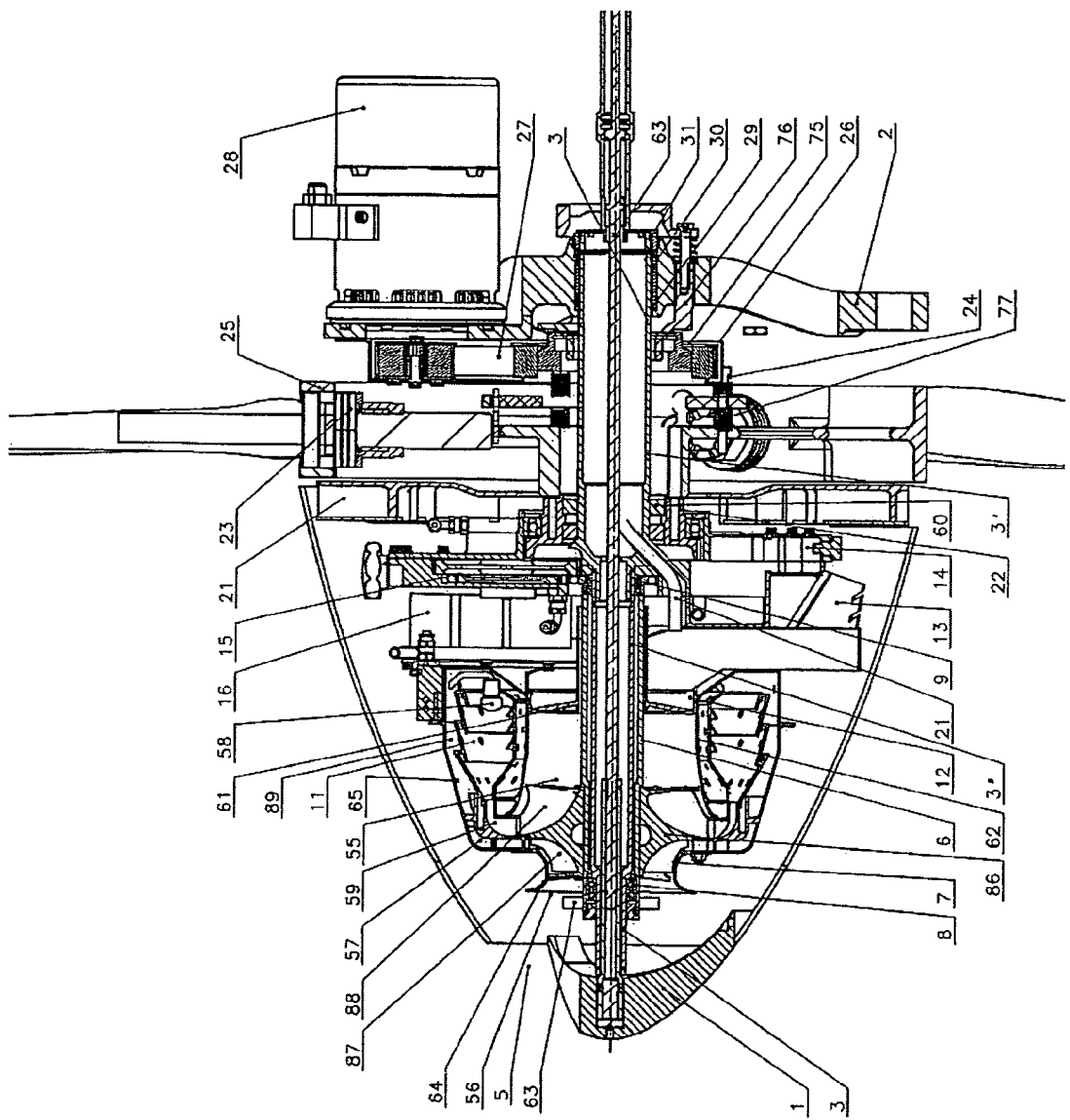
Figure 3 – Overall illustration of drive unit

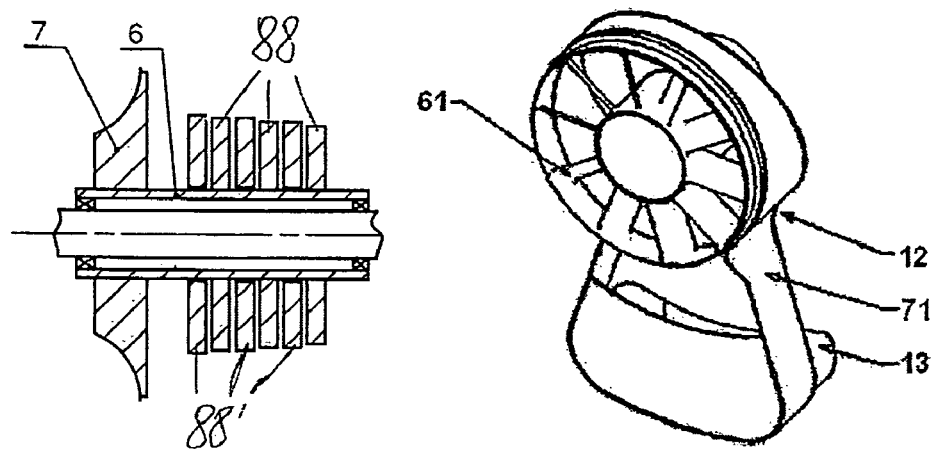
Figure 4 – Axial construction (variant)    Figure 6 – Exhaust geometry and swirl vanes
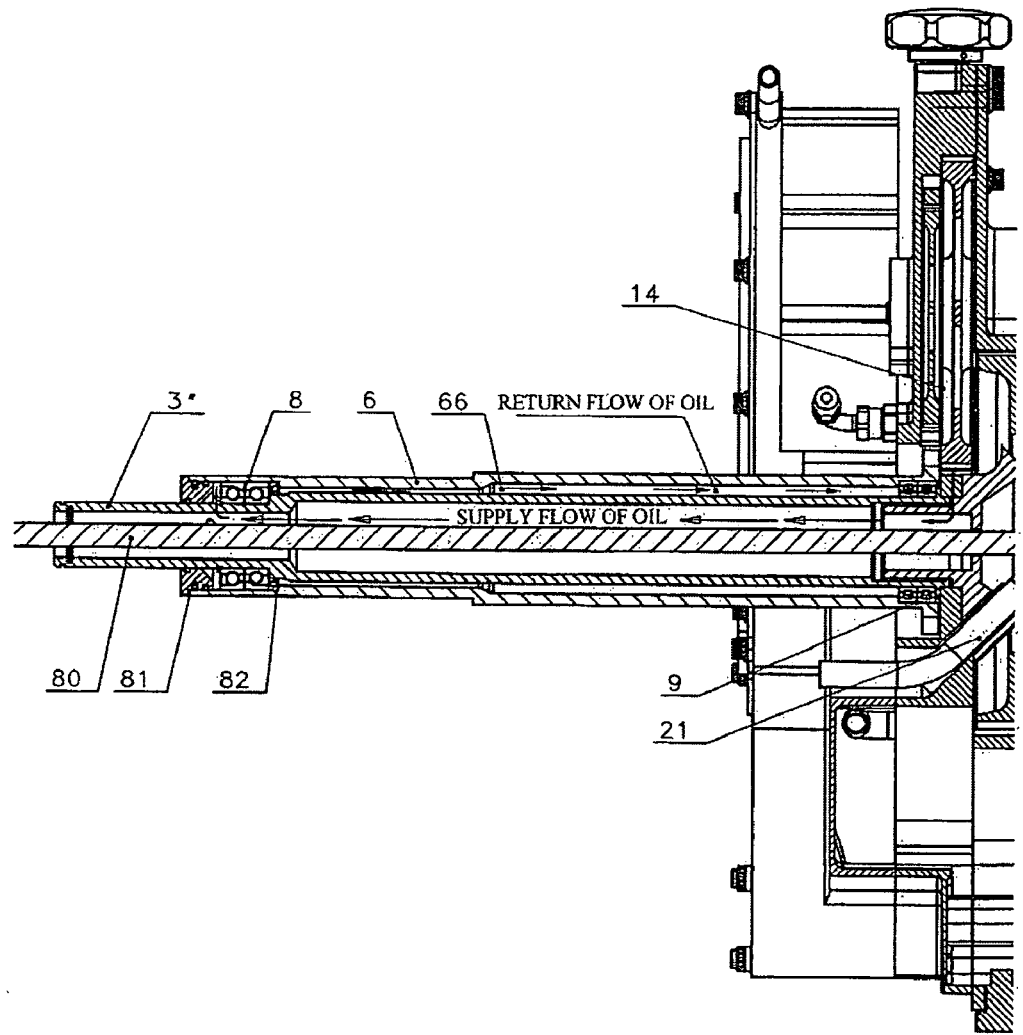
Figure 5 – Mounting and oil circuit

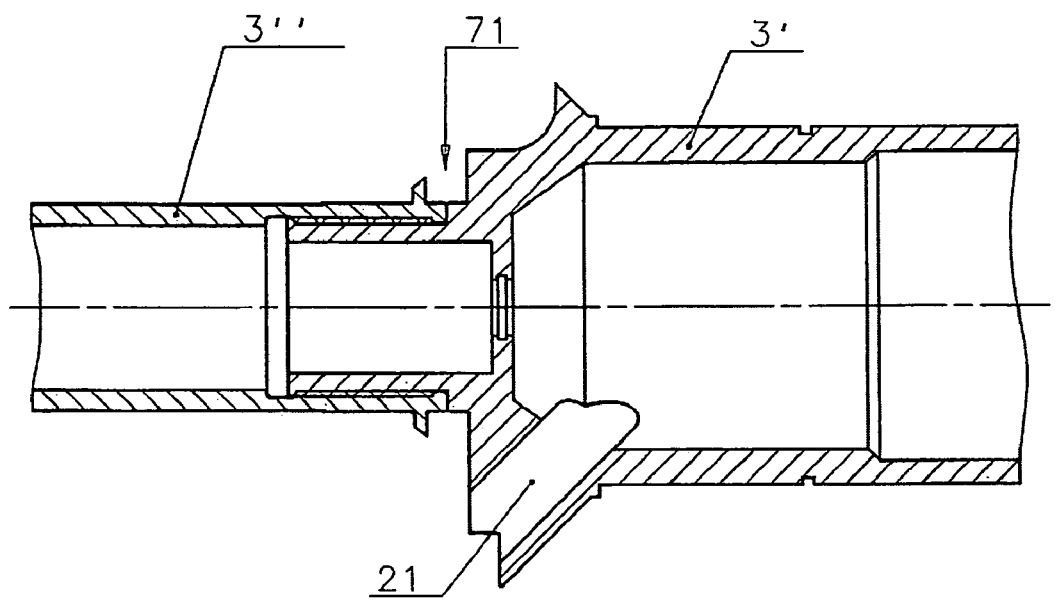
Figure 7 – Supporting hollow shafts
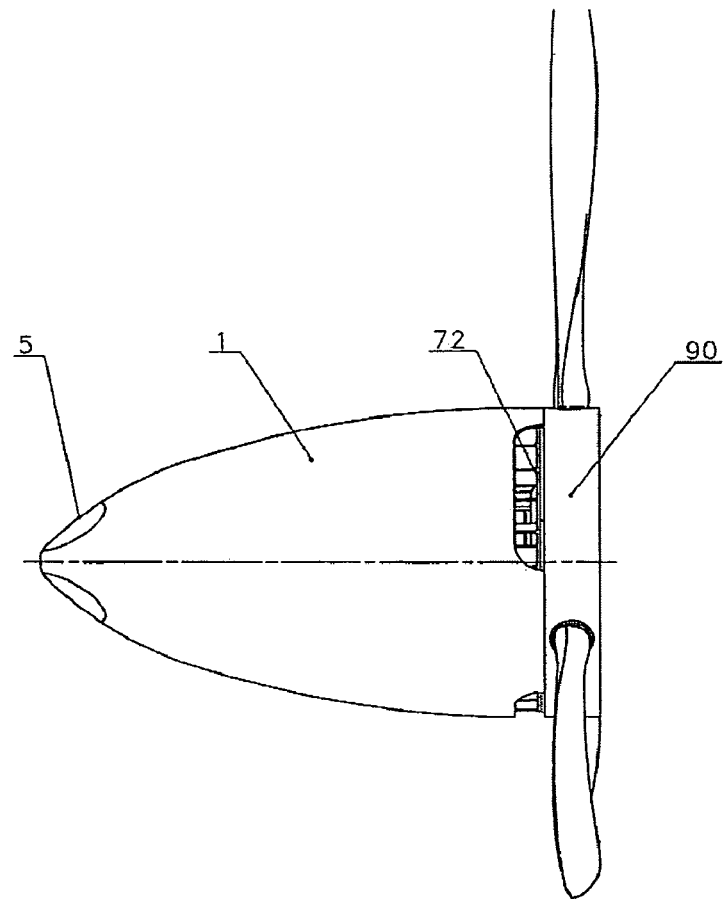
Figure 14 – Jointly rotating slide block

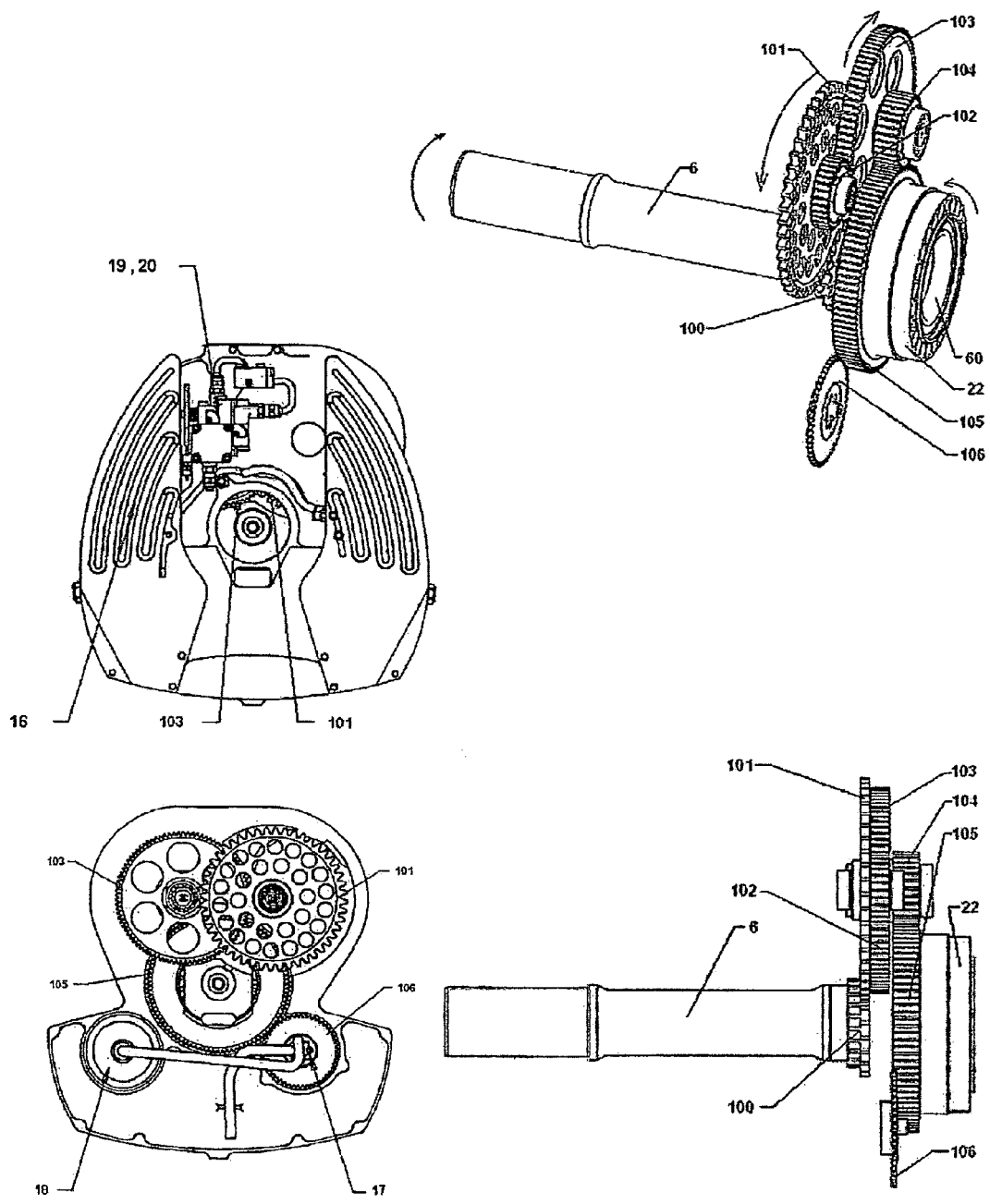
Figure 8a – Gear mechanism and additional units    Figure 8b – Gear stages and oil pump

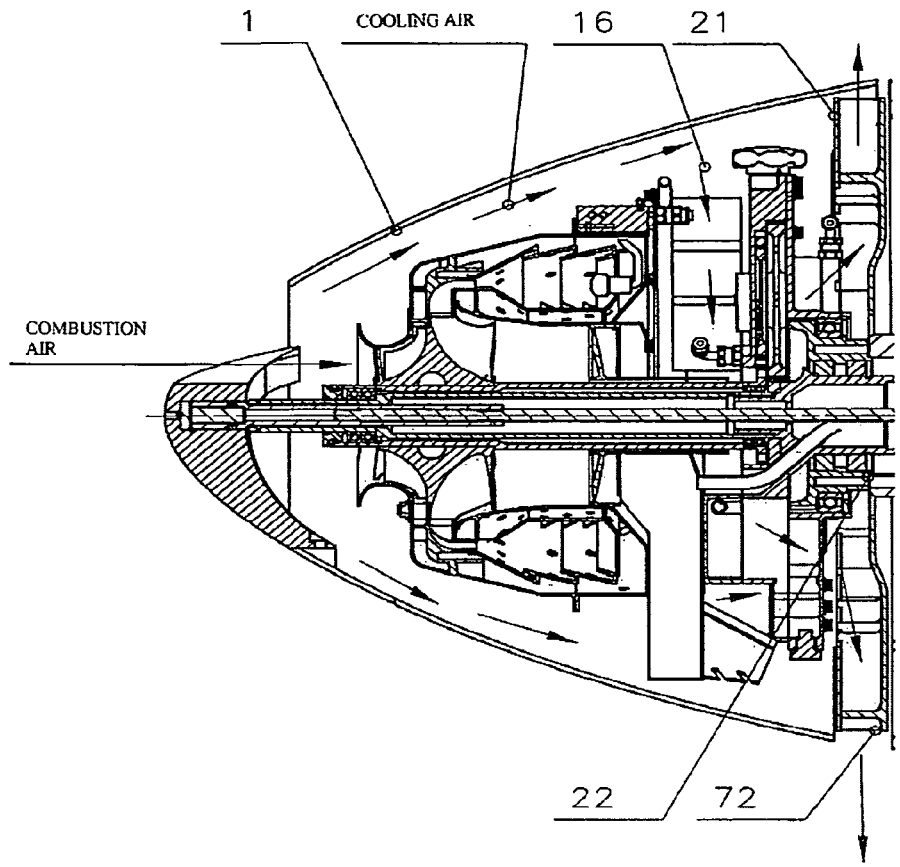
Figure 10 – Cooling-air flow
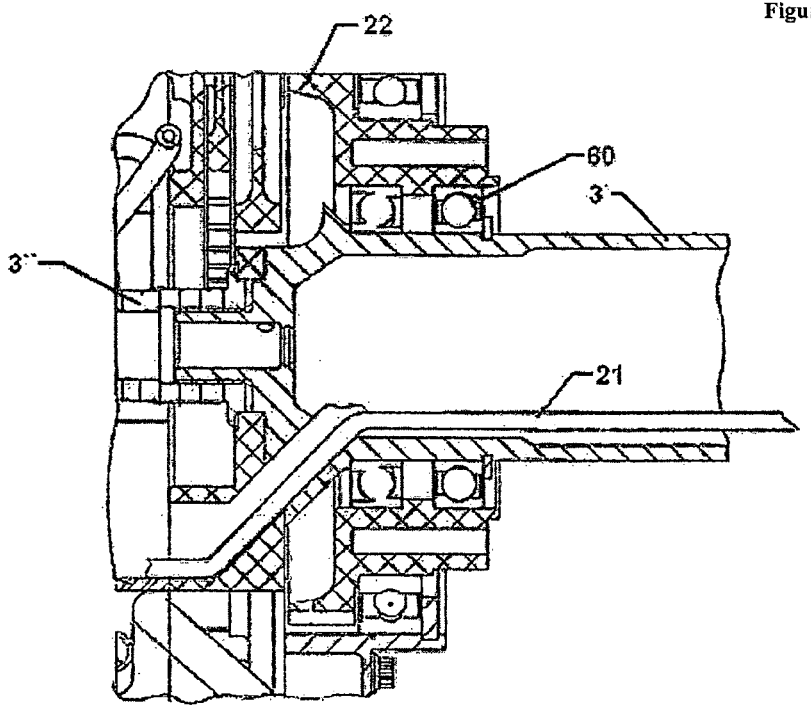
Figure 9 – Leading-through of the supply lines

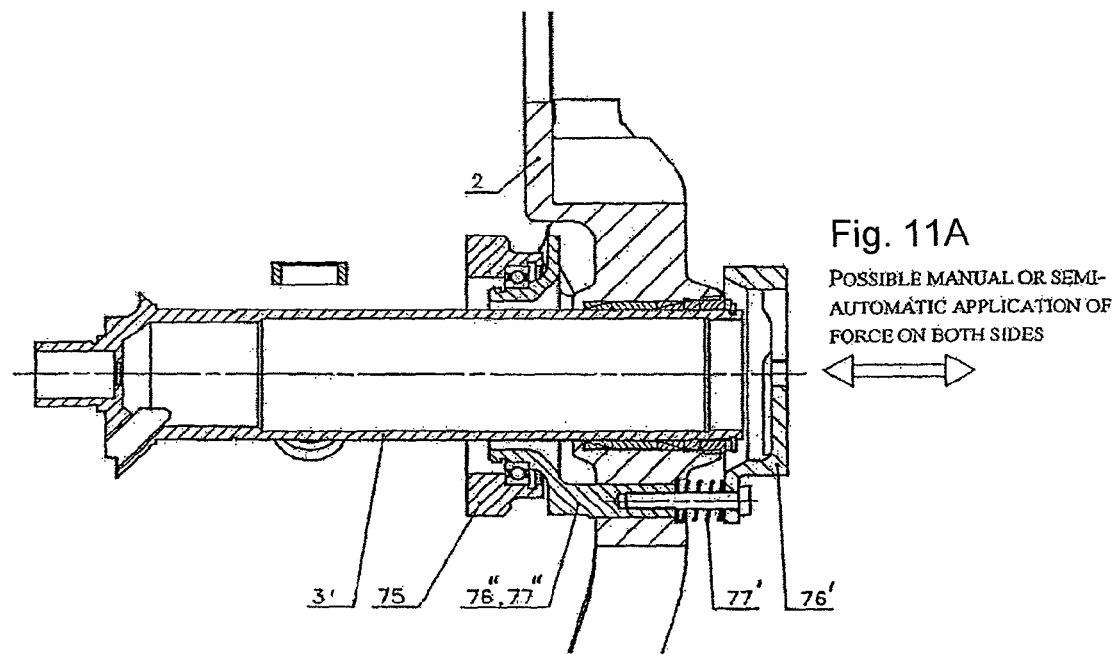
Fig. 11A
POSSIBLE MANUAL OR SEMI-AUTOMATIC APPLICATION OF FORCE ON BOTH SIDES
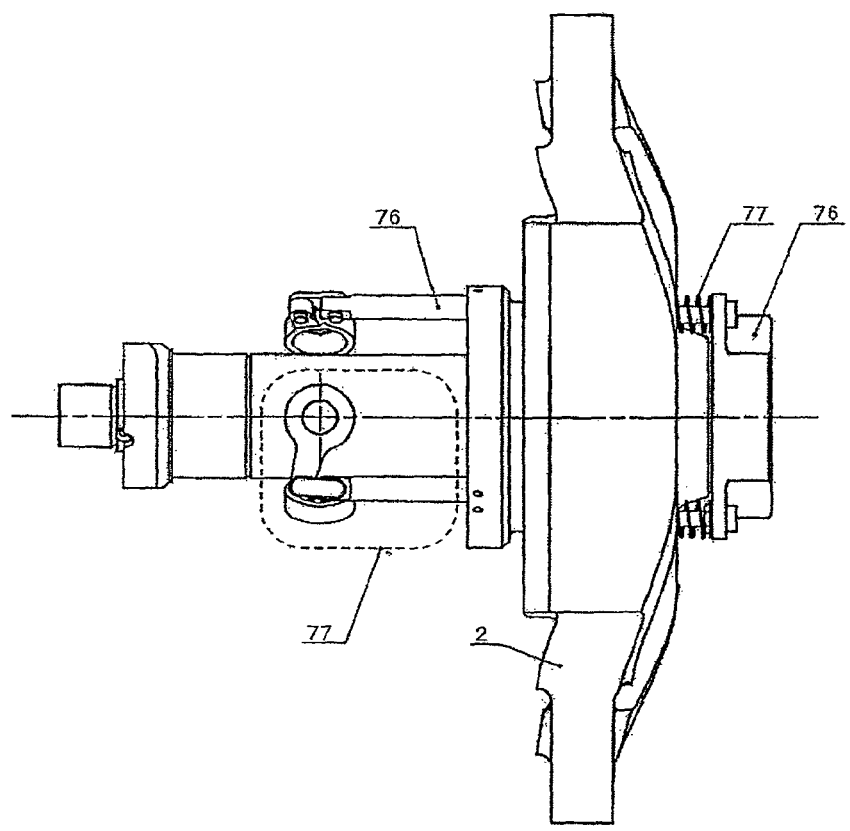
Figure 11 – Propeller-adjustment device

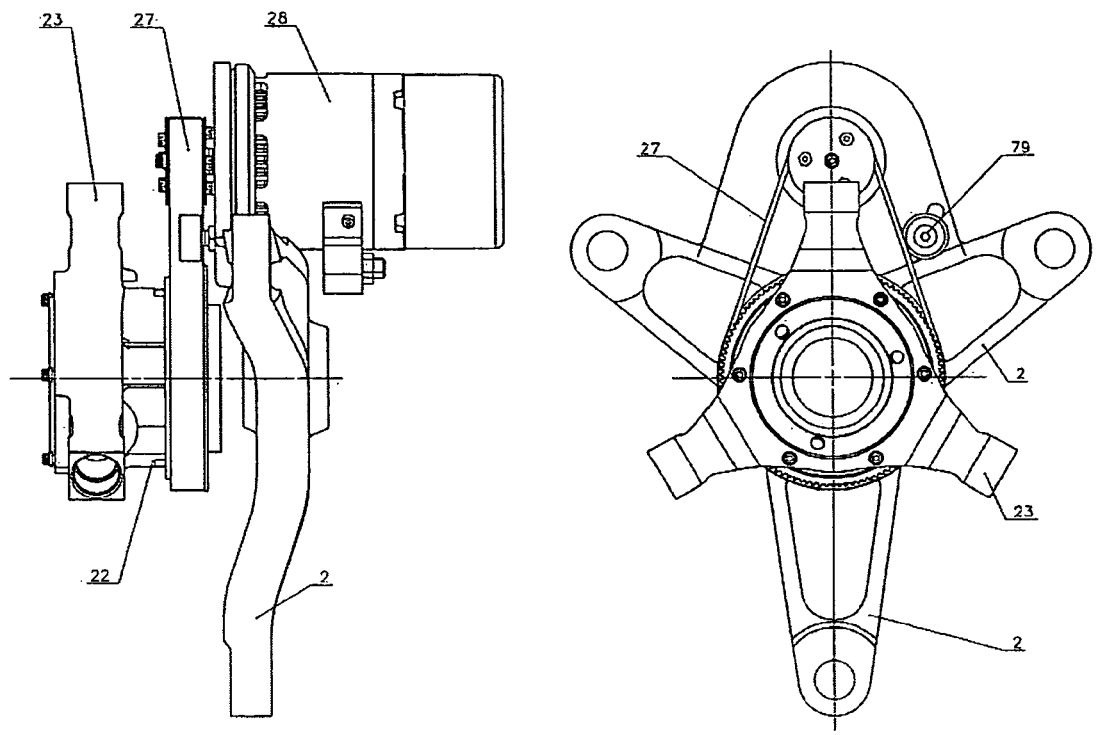
Figure 12 – Starter / generator unit
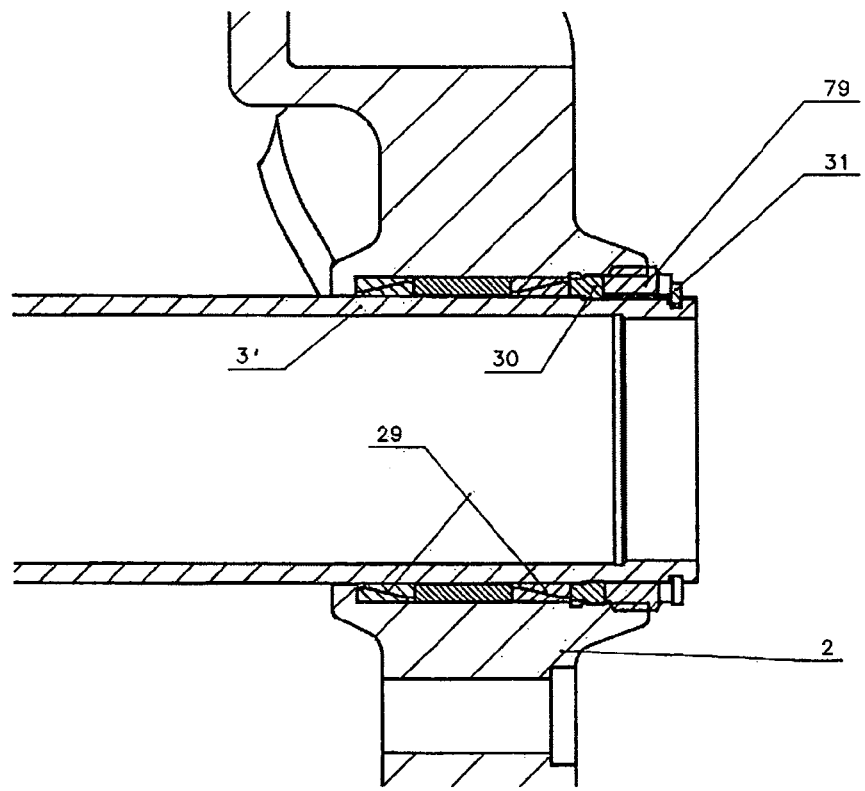
Figure 13 – Fixing system

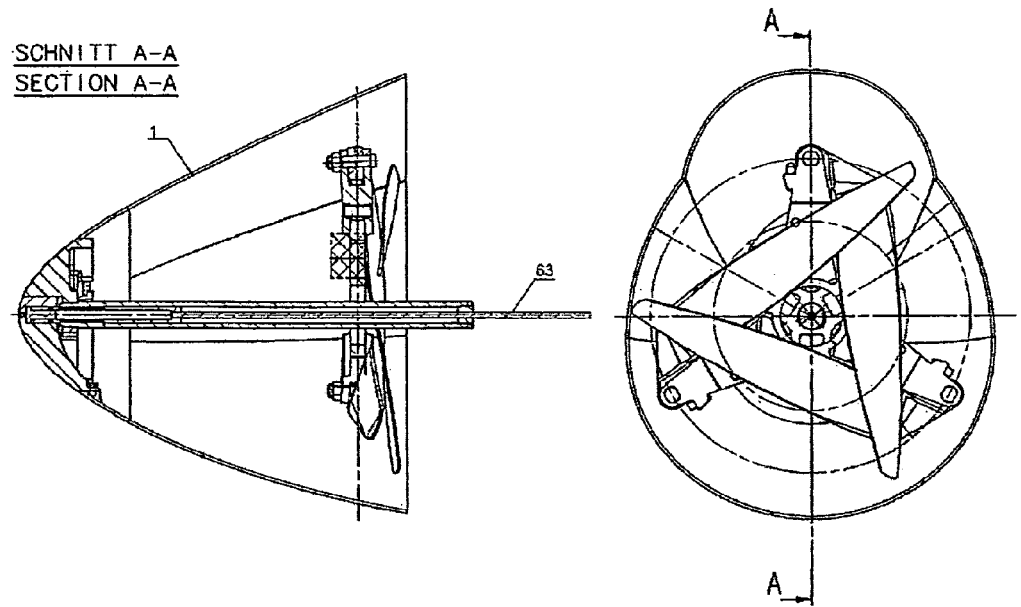
Figure 15a – Folding propeller closed
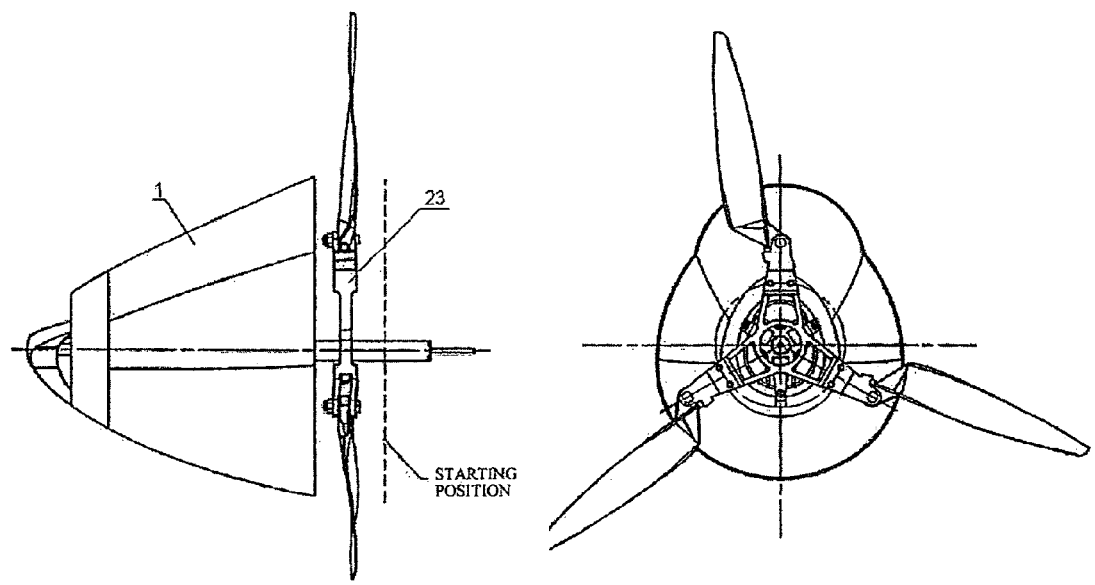
Figure 15b – Folding propeller opened

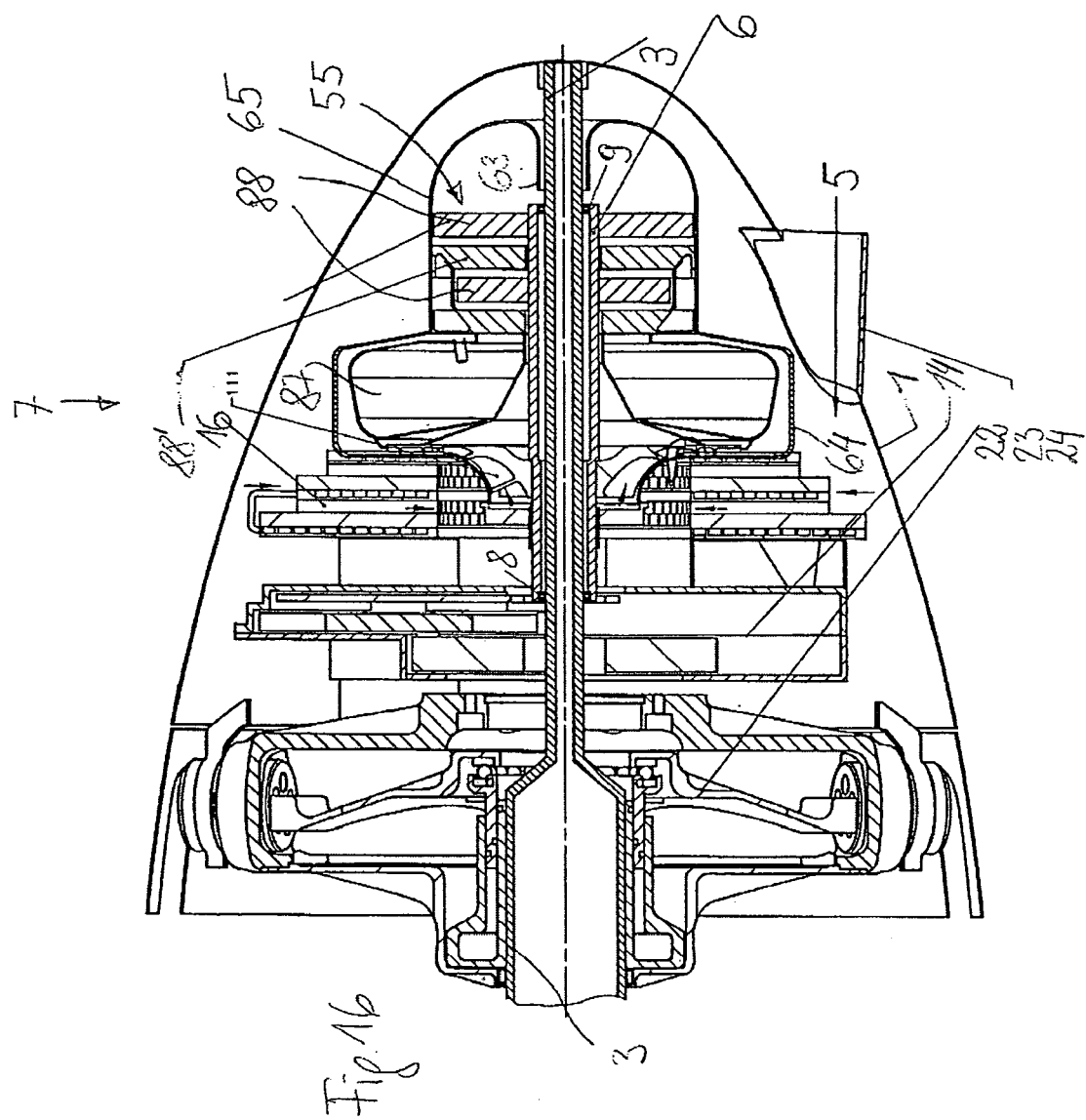

PROPELLER OR PROPELLER DRIVE

CROSS-REFERENCES TO RELATED APPLICATIONS

This application claims the priority of German Application No. 10 2005 043 615.3, filed on Sep. 9, 2005, the disclosure of which is incorporated herein by reference.

BACKGROUND OF THE INVENTION

The invention relates to a propeller or propeller drive for aircraft and watercraft.

SUMMARY OF THE INVENTION

An object of the present invention is to provide a compact drive unit with or for a propeller. A further object of the invention is to provide a propeller with a drive unit. Propellers or propeller drives of this type can be used for example in the case of missiles, in particular propeller-driven airplanes or drive pods for aircraft or watercraft of any type.

The drive unit should be accommodated in the propeller spinner and should utilize the otherwise unused space in an aerodynamically ideal manner, so that it is possible to dispense with bulky engine spaces in the body and a power transmission—possibly complicated—to the propeller. The seats for the pilot and additional persons should be provided immediately adjacent to the propeller. In addition, in view of the limited space available in the propeller spinner, the drive unit should be designed in a mechanically simple manner and should be capable of high performance, and the drive unit, in particular in the form of a drive pod for aircraft and watercraft, should permit an aerodynamically ideal shape.

By means of the arrangement, according to the invention, of a gas turbine on a drive shaft situated in front of the propeller, i.e. in front in the propulsion direction, a smoothly running and compact high-performance drive unit is made possible.

In the case of lower-powered turbines, it is structurally advantageous for the compressor stage to be arranged in front of the turbine. If higher performances are desired, a multiple-stage axial turbine with a compressor stage arranged to the rear contrary to the propulsion direction is used, these in turn being jointly arranged in front of the propeller in the propulsion direction.

The compressor stage can be at least one radial compressor stage, or an axial compressor stage or combined versions. The turbine can be a single- or multiple-stage radial or axial turbine or a combined version. It is provided in a space-saving manner that a radial compressor is provided as the compressor stage and an optionally multiple-stage radial turbine is provided as the turbine.

A particularly space-saving design is produced when the turbine and the compressor stage are formed by a single component mounted on the drive shaft. The component has on one of its sides the compressor blades of the turbine stage and on its other side the turbine blades. In this way, very short structural lengths can be achieved, so that account is taken of the limited space in the propeller spinner. In addition, a component of this type does not project to an excessive degree radially, so that the component can be accommodated in the forward end region of the propeller spinner in a satisfactory manner in terms of space.

In a further advantageous utilization of the restricted availability of space in the propeller spinner the structural elements are constructed so that it increases the compactness of the drive unit and allows it to be accommodated in the propeller spinner in an advantageous manner. The radial extension of the individual structural elements provided can advantageously be selected in such a way that despite a high power output the internal contour of the propeller spinner is approximated and so the space is filled up tightly.

It is further advantageous to situate the bearings in accordance with the present invention as far as possible from the hot turbine, or a suitable lubrication of the support shaft can take place at the same time as cooling of the oil in the oil cooler.

Advantageous embodiments of the invention are set out in the following description and in the drawings.

BRIEF DESCRIPTION OF THE DRAWINGS

FIG. 1 is a diagrammatic illustration in plan view of a propeller-driven airplane with a propeller spinner situated in front of the propeller in the flight direction.

FIG. 2 is an illustration of a missile with a propeller or an engine pod or a drive unit for airplanes with a plurality of propellers or as a drive for other aircraft and watercraft.

FIG. 3 is a diagrammatic cross-section through a drive unit according to the invention.

FIG. 4 shows an embodiment of a turbine compressor unit.

FIG. 5 is a diagrammatic illustration of the mounting of a drive shaft on the support shaft and the oil and lubricant circulation.

FIG. 6 is a diagrammatic illustration of an exhaust diffuser.

FIG. 7 shows the location of the joint of the parts forming the support shaft.

FIGS. 8a and 8b are diagrammatic illustrations of an oil cooler and of the arrangement of the fuel pump and the gear mechanism.

FIG. 9 shows the guidance of fuel lines.

FIG. 10 is a diagrammatic illustration of the guidance of the cooling air and the combustion air.

FIGS. 11 and 11a show an adjustment of the propeller blades.

FIG. 12 is a diagrammatic illustration of a starter/generator unit.

FIG. 13 shows the fastening of the support shaft on the drive-unit support or on the body of the missile.

FIG. 14 is an external view of the propeller spinner.

FIGS. 15a and 15b show a drive unit with a folding propeller in the folded-down and opened state respectively.

FIG. 16 shows an alternative embodiment of a turbine with a compressor stage.

DESCRIPTION OF THE PREFERRED EMBODIMENTS

FIG. 1 is a diagrammatic plan view of a single-motor propeller-driven airplane 50 with a body 53 and a propeller spinner 1, which receives a drive unit according to the invention.

FIG. 2 is a diagrammatic side view of an engine pod 51 with a body for multiple-motor propeller machines or as a drive for an aircraft or water craft, in which the drive unit according to the invention is arranged in the propeller spinner 1 and suitable receiving facilities for fuel and drive-unit components are provided in the pod 51.

FIG. 3 shows diagrammatically in a sectional view a propeller drive unit according to the invention. This drive unit is mounted on a drive-unit support 2 fastened in the body 53 of the missile or propeller-driven craft or the engine pod, namely on a support shaft 3 projecting from the drive-unit support 2 in the longitudinal direction. The support shaft 3 comprises two parts, namely a first part 3' fastened, and in particular wedged, in the drive-unit support 2, and a second part 3" connected to the first part 3' in a fixed manner.

A drive shaft 6 with bearings 8 and 9 respectively at the ends is mounted on the second part 3' in a rotatable manner. In its end region facing away from the propeller the drive shaft 6 carries a compressor stage 7 with radial or axial wheels or blades 87. A gas turbine 55 is arranged immediately following the compressor stage 7 in the direction of the propeller 23. The compressor stage 7 and the turbine 55 are advantageously constructed in the form of a one-piece component 86; i.e. the vanes 87 of the compressor stage 7 are formed on one side on a main component 86 and the blades or vanes 88 of the turbine 55 are situated on the axially opposite side.

A plurality of compressor stages or a plurality of turbines can be provided. The compressor stage and the turbine can be both radial or axial and combined units. FIG. 4 is a diagrammatic illustration of a radial compressor stage 7 which is mounted on the drive shaft 6. In this case the turbine comprises turbine vanes 88 of a first, second and third compressor stage. A further possible variant is represented by the arrangement of the turbine in front of the compressor, in order to be able to achieve an improved thermal separation from the propeller. The guide vanes or rims required are designated 88'.

The combustion air supplied through a suction opening 5 in the propeller spinner 1 enters the compressor stage 7 through a central suction opening 56 and is introduced into a suction manifold 57 through the radially extending blades 87 of the compressor stage 7 and passes from there into a reverse combustion chamber 11. The combustion chamber 11 is used for shortening the structural length of the drive unit. In the same way, a conventional combustion chamber could be provided, in which case the turbine 55 would have to be arranged at the end of the combustion chamber so as to be spatially separate from the compressor stage 7.

On grounds of space it may be advisable for the combustion chamber 11 to be constructed in the form of a reverse combustion chamber, the inlet of which is connected to the air outlet of the compressor stage 7 situated directly in front of the combustion chamber 11 in the longitudinal direction of the support shaft 3 and the outlet of which is connected to the inlet of the turbine 55 situated directly in front of the combustion chamber or surrounded by the combustion chamber 11 at least in part.

The forward part of the housing 65 of the combustion chamber 11 is used for receiving the air compressed by the compressor stage 7, so that the compressor stage 7 conveys directly into the combustion chamber 11, a reversal of air taking place in the region 57. The combustion gases, which flow out of the reverse combustion chamber 11, are likewise reversed radially by way of an outlet manifold 59 and encounter the vanes 88 of the turbine 55 in the radial direction. The outlet openings or the gas ducts are part of the combustion-chamber housing 65. The turbine 55 is bounded radially on the outside by the inner wall of the combustion-chamber housing 65, or a separate housing for the turbine 55 is not necessary if the turbine 55 is bounded by the inner wall of the combustion-chamber housing 65. The inner wall of the combustion-chamber housing 65 then leads the escaping exhaust-gas flows directly to the exhaust-gas diffuser 12.

Fuel is sprayed into the combustion chamber 11 by means of a fuel-injection device 58. The air supplied by the compressor stage 7 is introduced into the combustion chamber 11, in particular through openings 89 formed in the walls of the combustion chamber 11. The combustion gases passing out of the reverse combustion chamber 11 are supplied to the turbine 55 by way of the outlet manifold 59 in the radial direction and set the turbine 55 in a corresponding rotation which the drive shaft 6 and the compressor stage 7 follow.

The gases passing out of the turbine 55 arrive in an exhaust-gas diffuser 12. The exhaust-gas diffuser 12 imparts a rotation to the gases, and the jet of exhaust gas set in rotation in this way is removed, by way of an exhaust duct 13 adapted to the flow and preferably omega-shaped, to the outside. As shown in FIG. 6, the exhaust-gas flow passing out of the turbine 55 is set in rotation by the swirl vane 61 of the exhaust-gas diffuser 12 and is led into the preferably omega-shaped exhaust-gas duct 71. In this case the exhaust gases are accelerated to the correct level and are removed from the spinner 1 through the exhaust duct 13 at an angle advantageous in terms of flow dynamics.

The driving power is transmitted from the drive shaft 6 to a gear unit 14 in which a reduction gear 15 is preferably arranged. An oil cooler 16, an oil pump 17 and an oil filter 18 are carried by the gear mechanism 14, starting in a direction towards the propeller spinner 1. The mechanical drives for a fuel pump 19 and a fuel-control device 20 are provided in the centrally arranged apertures in the oil cooler.

The gear unit 14 steps down the rotational speed of the turbine 55 or the drive shaft 6 to the rotational speed of the propeller 23 and incorporates the oil pump 17, an oil tank 17', an oil filter 18 and the oil cooler 16 in a very narrow design, as shown in greater detail in FIGS. 8a and 8b. The reduction wheels of the gear mechanism 14 which are provided are used for driving the fuel pump. The oil cooler 16 is constructed in a blade-like manner and thus allows the arrangement of subsidiary units, in particular the arrangement of the fuel pump 19 and the rate regulation or the fuel-control device 20 in the interspace formed.

The end of the drive shaft 6 towards the propeller is provided with a driving gearwheel 100 which meshes with a gearwheel 101 which carries a gearwheel 102. The gearwheel 102 meshes with a further gearwheel 103 which has a take-off gearwheel 104. The take-off gearwheel 104 meshes with wheel 105 of a gear mechanism that carries the propeller take-off flange 22 which is optionally mounted on a bearing 60 of the first part 3' of the hollow shaft 3. Wheel 105 of the gear mechanism meshes with a driving wheel 106 of the oil pump. In this way, a very flat gear mechanism is produced, which can also drive the oil pump or can also convey the fuel by way of further gearwheels or can drive a fuel pump. The gearwheels are mounted in the gear-mechanism housing, which in turn is fastened on the hollow shaft 3 in a fixed manner in the region of the location where parts 3' and 3" are joined.

The driving moment is transmitted from the gear mechanism 14 by way of a gearing take-off flange 22 to the propeller 23 which can have an integrated jointly rotating blade-adjustment device 24. The blade-adjustment device 24 is actuated by way of adjustment means arranged on the drive-unit support 2 and actuable from the interior of the body 53. As shown in FIG. 11, the jointly rotating blade-adjustment device is adjustable in an axial manner manually or by way of a separate operating unit. A continuous ring 75 is provided for the axial positioning of the lever mechanism comprising levers 76" and 77". As a result of actuating a control member 76' in a suitable manner, the continuous ring 75 is adjusted resting against the adjustment mechanism for the blades of the propeller 23 by way of a lever mechanism loaded by a pull-back spring 77'.

The driving force necessary for starting or for generating current is transmitted by way of the propeller take-off flange 25 with a toothed-belt pulley 26 connected thereto. The belt drive 27 represents the mechanical link with the starter or to the generator 28. FIG. 12 shows a starter motor 28 which is carried by the drive-unit support 2 and which engages by way of the toothed-belt drive 27 on the gearing take-off flange 22 of the propeller 23 or which can set the propeller 23 and thus the gear mechanism 14 or the turbine 55 in rotation.

The axial and radial fastening of the hollow shaft 3 on the drive-unit support is preferably carried out with clamping elements 29 and a toothed anti-rotation device 30 or with an axial Seeger circlip ring 31. FIG. 13 shows the radial and axial fastening of the support shaft 13 constructed in the form of a hollow shaft on the drive-unit support 2. The fastening is advantageously carried out with clamping elements 29 and a toothed anti-rotation device 30 and finally the axial securing means 31, in particular a Seeger circlip ring which secures a threaded ring 79. The wedge-shaped clamping elements 29 are clamped with the threaded ring 79, which is prevented from rotating, and provide a secure seat of the support shaft 3 in the drive-unit support 2.

The gear mechanism 14 is fastened or fixed on the hollow shaft 3. This fastening or fixing takes place in particular in the portion of the hollow shaft 3 in which the first part 3' is connected to the second part 3". This simplifies the mounting of the drive unit; first the mounting of the gear unit 14 on the first part 3' takes place and then the fastening of the second part 3" to the first part 3', optionally accompanied by clamping the gear unit 14 on the first part 3' in a fixed manner when the two parts 3' and 3" are joined. FIG. 7 shows the joint between the first part 3' and of the second part 3" of the hollow shaft 3. The first part 3' is inserted into the second part 3", in which case a groove 71, into which the gear mechanism 14 can be inserted or clamped, is formed between the parts. The two parts 3' and 3" can be optionally connected to each other by bolts and suitable bolt-securing means.

It is clear from FIG. 3 that the turbine 55 and also the exhaust-gas diffuser 12 and its swirl vanes 61 are surrounded or enclosed by the housing 62 of the combustion chamber 11. In this way, the axial length of the drive unit is shortened.

As may be seen from FIG. 3, the contour of the drive unit or the contour of the components forming the latter follow the internal contour of the propeller spinner 1. The elements arranged in succession in the longitudinal direction of the support shaft, namely the compressor stage 7, the turbine 55, the combustion chamber 11, optionally the oil cooler 16, the gear mechanism 14 or its housing and optionally the cooling plate of the oil cooler 16, have an external contour which approximates the course of the inner wall of the spinner 1. This results in a very compact drive unit which is satisfactorily accommodated in the propeller spinner 1.

It is advantageous for the support shaft 3 to be constructed in the form of a hollow shaft, since in this case a supporting or actuating rod 63 for the displacement of the spinner 1, which can be adjusted in the longitudinal direction of the support shaft 3 by the supporting or actuating rod 63, can be guided in the hollow shaft. The purpose of this is that, in the case where the propeller 23 is constructed in the form of a folding propeller, the propeller spinner 1 can be displaced forwards in order to form the gap for the propeller 23.

It is also advantageous for the compressor 7 and the turbine 55 to be arranged directly in the foremost region of the propeller spinner 1, since the air entering through a suction opening 5 formed in the spinner 1 can be drawn in this way directly into the suction opening 56 of the compressor housing.

It is also possible for the turbine housing or compressor housing and optionally the combustion-chamber housing 65 to be supported on the support shaft 3 in the end region of the latter remote from the propeller. In particular, a bearing 63 axially displaceable on the support shaft 3 can be provided for this case, in order to be able to compensate thermal expansion, in particular of the combustion-chamber housing 65.

The bearing 63 is illustrated only in outline in FIG. 3.

The support of the housing 64 of the compressor stage 7 and the housing 65 of the combustion chamber 11 takes place primarily by way of the gear-mechanism housing and it does not affect the mounting of the revolving drive shaft 6 which rotates about the stationary support shaft 3.

The bearings 8 and 9 of the drive shaft 6 are arranged in the region of or on the axial ends of the drive shaft 6 in order to optimize the cooling. In order that at least the bearing 8 arranged on the side of the compressor stage should be lubricated to an adequate degree, an oil circuit with pump conveying is provided, which provides an adequate lubricating film of oil spray. FIG. 5 shows the gap 66 for the oil flow which runs between the drive shaft 6 and the support shaft 3 and which is led by way of the gear mechanism 6 and/or the oil cooler 16 and enters the part 3" of the support shaft 3 in the region of the gear mechanism and is led through the support shaft 3 to the forward main bearing 8 and enters the gap 66 again from the main bearing 8. A suitable pump wheel is incorporated in the region of the bearing 8 in order to ensure the oil supply.

The numeral 21 indicates an exit point or an outlet for control and supply lines out of the interior space of the first part 3' of the hollow shaft 3, in order to be able to supply the drive unit with fuel or to control it.

FIG. 9 shows the possibility of leading fuel lines or control lines through a sealed-off recess 21 in the gearing part in the manner already illustrated in FIG. 7.

FIG. 10 shows the flow of the cooling air drawn in, which is conveyed by a cooling plate or a ventilator 21 jointly rotating with the take-off flange 22 or the propeller 23. The quantity of air conveyed is discharged radially by way of outlet openings 72 in the spinner 1. In this case the air drawn in is led off by way of the air cooler 16.

As may be seen from FIG. 14, cooling-air outlets 72 are formed in the propeller spinner 1 for the air which has entered through the suction opening 5. The gap between the propeller spinner 1 and the casing of the body is covered with a jointly rotating slide block 90 in which the outlet openings 72 for the cooling air can optionally be formed.

FIG. 15a shows a propeller, which is constructed in the form of a folding propeller, in its setting with the blades folded down. In this case the spinner 1 can be adjusted by the support and actuating rod 63 in such a way that the propeller spinner 1 rests against the body or adjoins the body directly without a gap. In FIG. 15b the propeller spinner 1 is illustrated in its advanced setting in which it frees the propeller 23, so that the propeller blades can be extended or swung up. The movement of the propeller spinner 1 is not impeded by the design of the drive unit, and the propeller spinner 1 surrounds, at a suitable distance, the external contour of the drive unit, which approximates its internal contour so that the axial displacement of the propeller spinner 1 is possible without adverse effects.

In the case of the drives according to the invention, it is possible for propellers capable of being pivoted in or propellers not capable of being pivoted in to be provided in the same manner. These may be rigid propellers or propellers adjustable with respect to their angle of incidence.

in one piece. A drive shaft 6, which carries a two-stage axial turbine 55, is mounted in a rotatable manner on the support shaft 3. The turbine vanes 88 are connected to the drive shaft 6; the guide rims 88' of the axial turbine 55 are fastened to the combustion-chamber housing 65. The combustion-chamber housing 65 and the compressor-stage housing 64 are situated in front of the gear mechanism or are carried by the gear-mechanism housing 14.

The compressor stage 7 situated between the turbine 55 and the gear-mechanism housing 14 comprises compressor vanes 87 which either rotate with the drive shaft 6 or, as in the present case, are formed in a stationary manner on the compressor housing 64 and/or on the combustion-chamber housing 65. The supply of combustion air takes place by way of an inlet 5 formed in the spinner 1. The air entering through the inlet 5 flows—as indicated by arrows—by way of the oil cooler 16 as a result of a suitable suction action into the compressor stage 7, in which case the air flowing in is led by way of baffle plates 111.

The fuel-injection units provided in the turbine housing or combustion-chamber housing 65 are not shown.

The compressor-stage housing 64 and the combustion-chamber housing 65 are supported in a bearing 63 on the support shaft 3. A lubricant circuit is formed in the gap between the drive shaft 6 and the support shaft 3.

The exhaust-gas duct or outlet for the combustion gases from the combustion-chamber housing 65 is not shown in FIG. 16. The exhaust-gas duct is situated in the region of the combustion-chamber housing 65 and consists in a suitable outlet manifold which opens into an outlet opening in the spinner 1.

The annular combustion chamber arranged in front of the turbine 55 charges the combustion air supplied, and this charged air is relaxed in the turbine stage and is removed by way of the outlet duct (not shown) situated in the forward region of the spinner.

The propeller 23 is driven in a comparable manner to what is illustrated in FIG. 3. The power transmission between the gear mechanism and the propeller is not taken into consideration in the illustration of FIG. 16.

In the case of the embodiment as shown in FIG. 16, it is also clearly evident that the structural groups arranged in succession in the spinner 1, namely the two-stage axial turbine 55, the compressor stage 7, the oil cooler 16 and the gear mechanism 14, follow the internal contour of the spinner with respect to their radial extension in relation to the support shaft 3 or are satisfactorily adapted to them. In this way, the dimensions of each individual structural group are fully observed and an optimum packing density is achieved.

Since the turbine 55 is arranged in front of the compressor 7, a satisfactory thermal separation from the propeller 23 is achieved.

In order to ensure the optimum thermal separation of the exhaust gas and the propeller 23, the gear mechanism 14 and the propeller unit 23 are arranged behind the compressor stage 7 in the propulsion direction. This thermal separation takes place independently of the nature of the turbine used.

In the embodiment as shown in FIG. 16, the arrangement of the gear mechanism and the oil cooler takes place in a manner comparable with the embodiment as shown in FIG. 3; FIG. 16 is reversed laterally with respect to the arrangement as shown in FIG. 3.

In the case of the propeller drive unit as shown in FIG. 16, the actuating rod 63 is omitted since the spinner 1 is fixed axially.

The invention claimed is:

1. A propeller drive for aircraft or watercraft comprising a propeller, a propeller spinner located forward of the propeller in a propulsion direction of the aircraft or watercraft, a support shaft carrying the propeller, projecting from a body of the aircraft or watercraft and formed by a hollow shaft about which the propeller rotates, a drive unit for the propeller being situated in front of the propeller in the propulsion direction of the aircraft or the watercraft, and a drive shaft mounting at least one gas turbine which drives the propeller via a gear train arranged between the at least one gas turbine and the propeller, wherein the drive shaft extends through and is rotatable relative to the support shaft, and wherein the drive unit for the propeller comprises the at least one gas turbine and is arranged within the propeller spinner.

2. A propeller drive according to claim 1, including at least one compressor stage having blades which are secured to and rotate with the drive shaft about the support shaft or which are secured to at least one of a housing of a combustion chamber and a housing for the compressor stage, the blades being arranged on at least one of a side of the gas turbine facing away from the propeller or a side of the gas turbine facing the propeller.

3. A propeller drive according to claim 2 wherein at least one compressor stage is located immediately adjacent to the gas turbine.

4. A propeller drive according to claim 2 wherein the gas turbine or the turbine vanes and the compressor stage or the compressor blades form a one-piece component.

5. A propeller drive according to claim 2 including an exhaust-gas diffuser with a swirl vane, and wherein at least one of the turbine, the exhaust-gas diffuser or the swirl vane are at least partially surrounded by or enclosed inside the housing of the combustion chamber.

6. A propeller drive according to claim 2 wherein at least one of the gas turbine, the compressor or the housing for the compressor stage is supported by an end portion of the support shaft facing away from the propeller.

7. A propeller drive according to claim 2 wherein at least one of the housing for the combustion chamber, the housing for the compressor stage, or a housing for the turbine is supported by a bearing that is axially movable on an end portion of the support shaft remote from the propeller.

8. A propeller drive according to claim 2 wherein the combustion chamber comprises a reverse flow combustion chamber having an inlet connected to an air outlet of the compressor stage situated upstream of the combustion chamber in the longitudinal direction of the support shaft and an outlet connected to an inlet of the turbine situated upstream of the combustion chamber and surrounded at least in part by the combustion chamber.

9. A propeller drive according to claim 2 wherein the compressor stage is a radial compressor and wherein the gas turbine is at least one of a radial turbine or a multi-stage axial turbine.

10. A propeller drive according to claim 9 wherein the axial turbine includes guide vanes which are supported by the housing for the combustion chamber.

11. A propeller drive according to claim 2 wherein one of the gear train or a housing for the gear train is secured to the support shaft, and wherein at least one of the multi-stage combustion chamber of the turbine or the housing for the combustion chamber, or the housing for the compressor stage, or an exhaust-gas diffuser or an oil cooler are carried by one of the gear train or a housing for the gear train and extend from a side of the housing for the gear train remote from the propeller towards the turbine.

12. A propeller drive according to claim 2 wherein the elements following in succession in the longitudinal direction of the support shaft, namely the compressor stage followed by the gas turbine or the turbine followed by the compressor stage, the combustion chamber and, when present, an oil cooler, the gear train, the housing for the gear train, and a cooling plate, have an external profile which approximates a shape of an inner wall of the propeller spinner.

13. A propeller drive according to claim 1 including a supporting and actuating rod for at least one of retaining or displacing the spinner, the supporting and actuating rod extending through the hollow support shaft.

14. A propeller drive according to claim 1 wherein the support shaft comprises two parts capable of being joined to each other, and wherein the gear train is secured to a region where the two parts are joined.

15. A propeller drive according to claim 14 wherein the gear train is secured to a projecting end region of the first part of the support shaft that is supported by one of the body or an engine support connected to the body.

16. A propeller drive according to claim 15 including bearings which mount axial ends of the drive shaft on the support shaft.

17. A propeller drive according to claim 16 wherein the bearings for the axial ends of the drive shaft are supported on the second part of the support shaft.

18. A propeller drive according to claim 2 including a gap between the support shaft and the drive shaft and an oil circulation arrangement extending via the gear train and through the gap.

19. A propeller drive according to claim 14 including a gap between the support shaft and the drive shaft and an oil circulation arrangement extending via the gear train and an inside of the second part of the support shaft past the gap.

20. A propeller drive according to claim 1 including a fuel pump and a fuel line which extends at least partially through the support shaft to an end thereof proximate the gear train and which extends from the support shaft to the fuel pump.

21. A propeller drive according to claim 1 including control circuits which extend at least partially through the support shaft to an end thereof proximate the gear train and which further extend from the support shaft to a fuel pump.

22. A propeller drive according to claim 14 including at least one of a fuel line or control circuits which extend at least partially through the part of the support shaft that is proximate the body to the end thereof proximate the gear train, and which further extend from the support shaft to a fuel pump.

23. A propeller drive according to claim 20 wherein at least one of a fuel pump and a fuel control unit or a fuel mass regulator are arranged in a vicinity of an oil cooler or are combined into a one-piece component.

24. A propeller drive according to claim 1 wherein the propeller is supported on a drive flange that extends from the gear train towards the body.

25. A propeller drive according to claim 24 including a bearing which supports the drive flange on the support shaft.

26. A propeller drive according to claim 1 wherein the propeller includes propeller blades and including at least one of an adjustment device for adjusting the angular position of the propeller blades or a starter motor for the propeller at an end region of the support shaft proximate the body.

27. A propeller drive according to claim 1 including an exhaust opening which is at least one of adjustable or closable and which is located in a vicinity of a forward or lateral portion of the spinner.

28. A propeller drive according to claim 1 including a housing for at least one of the gas turbine or the compressor stage, and an intake opening which is located in a vicinity of at least one of the housings or surrounds the drive shaft.

29. A propeller drive for aircraft or watercraft comprising a propeller, a propeller spinner, a support shaft carrying the propeller and about which the propeller rotates, and projecting from a body of the aircraft or watercraft a drive unit for the propeller arranged in the propeller spinner, the drive unit including a compressor, a combustor and a rotatable turbine being situated in front of the propeller in the propulsion direction of the aircraft or the watercraft, and a drive shaft extending along and being rotatable relative to the support shaft mounting the turbine for rotatably driving the propeller via a gear train arranged between the turbine and the propeller.

30. A propeller drive for aircraft or watercraft comprising:
a propeller for moving the aircraft or watercraft in a propulsion direction,
a spinner defining a spinner housing located in front of the propeller in the propulsion direction,
a stationary support shaft extending from the aircraft or watercraft in the propulsion direction past the propeller into the spinner housing, and
a drive unit carried on the support shaft for rotating the propeller via a drive shaft that is rotatable relative to the support shaft and including a gas turbine having a rotor and a gear train, the rotor and the gear train being coupled to the drive shaft for rotating the propeller relative to the support shaft, the gas turbine and the gear train being located forward of the propeller in the propulsion direction and inside the spinner housing.

* * * * *